Patented Apr. 21, 1953

2,636,020

UNITED STATES PATENT OFFICE 2,636,020

REACTION OF A PHOSPHONIC ACID DICHLORIDE AND A DIHYDROXY COMPOUND AND RESINOUS PRODUCT

Henryk Zenftman, Saltcoats, and Roy McGillivray, Old Kilpatrick, Scotland, assignors to Imperial Chemical Industries Limited, a corporation of Great Britain No Drawing. Application October 4, 1949, Serial No. 119,564. In Great Britain October 22, 1948

6 Claims. (Cl. 260—61)

The present invention is concerned with the production of new and improved artificial resinous materials which exhibit an especially favourable combination of physical and chemical properties, and can be obtained from readily available materials, and to an improvement in the manufacture of artificial resinous polyphosphonates.

The new and improved artificial resinous materials produced according to the present invention are polycondensation products of the kind that have the chemical character of linear aromatic phosphonic poly-esters in which the phosphorus atoms are in the long chain and linked to two chain-forming aromatic esterifying groups and to a carbon atom of an organic radicle, and are characterised in that said organic radicle is cycloparaffinic.

The new artificial resinous materials become soft and fusible when sufficiently heated without exhibiting heat hardening properties and when solid fillers are incorporated into the softened or fused material thermoplastic compositions of high impact strength and hardness are obtained being in these respects much superior to similar filled masses obtained from linear aromatic phosphonic poly-esters in which the phosphorus linked carbon atom belong to an aromatic radicle. Moreover, the softening point of the new artificial resinous materials is higher than those of the last mentioned poly-esters.

These new materials are insoluble in water, alcohol, ether, paraffins, but are soluble in chloroform, cyclohexanone and mixtures of benzene and alcohol in certain proportions and various other mixtures of organic liquids which individually fail to dissolve them. Viscous solutions are thereby formed. They are chemically highly resistant to water, alcohols and acids, and are transparent and usually of a pale or colourless appearance. They are of unusually low inflammability and can be heated above 300° C. without decomposition. They are compatible with many other organic film-forming materials; for instance, they are miscible in all proportions with industrial nitrocellulose, and miscible in certain proportions with polyvinyl chloride and various other high polymers, and if desired plasticisers for such film-forming materials can be maintained in solution along with the new artificial resinous materials.

These new resins are especially suitable for use as binding agents for insoluble pigments, fillers and the like; and by incorporating these into the artificial resinous materials, produced according to the invention at temperatures above the softening point, easily mouldable or extrudable compositions of good hardness and high impact tensile strength are obtained.

The new resinous materials in their crude form may, if desired, be purified by extracting from them the very small proportion of unreacted progenitor compounds they still contain.

According to the present invention the process for the production of the new artificial resinous materials comprises effecting a condensation between a cycloparaffinic phosphonic acid dichloride and a dihydroxy-aromatic compound, both hydroxyl groups of which are nuclear and are attached to non-adjacent carbon atoms, resulting in the elimination of two moles hydrogen chloride from equimolecular quantities of the reacting progenitor compounds, by heating a mixture containing said progenitor compounds.

The condensation reaction may be brought about by heating a mixture of the said progenitor compounds in preferably equimolecular proportions until the required resinous properties have been developed in the reaction mixture by the completion of the reaction. It will be understood that moisture must be excluded during the reaction. Preferably the reaction is brought about by heating for several hours at temperatures rising progressively as the reaction proceeds from say 100° C.–190° C. at the start to say 220° C.–300° C. It is desirable slowly to stir the reaction mixture as its viscosity begins to increase. The presence of hydrogen chloride elimination catalysts such as metallic tin, in small proportions is desirable to assist the progress of the reaction.

The new artificial resinous materials may be considered to contain a recurrent grouping.

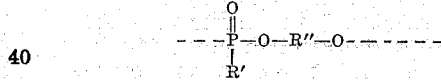

wrere R' is the cycloparaffinic radicle present in the phosphonic acid dichloride, e. g. cyclohexyl or cyclopentyl,

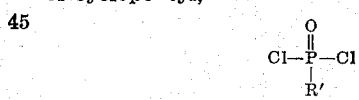

and R'' is the aromatic radicle present in the aforesaid dihydroxy-aromatic compound.

The aforesaid dihydroxy-aromatic compound whereof both hydroxyl groups are nuclear and attached to non-adjacent carbon atoms, may have one or more aromatic nuclei in its molecule, and in the latter case its hydroxy groups may advantageously be present in different nuclei; e. g. in the meta or para position to one another in a monocyclic dihydroxy-compound or in the 4:4' position in the case of a diphenyl derivative.

As the cycloparaffinic phosphonic acid dichloride there may advantageously be used cyclohexyl phosphonic acid dichloride. This compound is known and has been described in an article in the Journal of the American Chemical Society, volume 70, 1948, pages 3880–3882 by J. O. Clayton and W. L. Jensen.

As the dihydroxy-aromatic compound in which both hydroxyl groups are nuclear and attached to non-adjacent carbon atoms there may be used, for instance, hydroquinone or resorcinol, or chlorinated hydroquinone, or chlorinated resorcinol, or dihydroxy diphenyls for instance 4:4'-dihydroxy-diphenyl or chlorinated dihydroxy-diphenyl.

The invention is illustrated by the following examples.

Example 1

A mixture of equimolar proportions of cyclohexyl phosphonic acid dichloride (M. P. 38° C., boiling point 130° C. at 16 mm. pressure) and 4:4' dihydroxy diphenyl is heated on a metal bath in a glass vessel provided with slow stirring, and an air condenser from the end of which a tube leads to a hydrogen chloride absorption liquor. The contents of the vessel are protected from access of moisture by a calcium chloride tube. Hydrogen chloride begins to evolve at a bath temperature about 190° C., and after the reaction proceeds for 10 hours 1% metallic tin is introduced into the vessel and heating is continued at a temperature gradually increased to 280° C. in order to maintain sufficient fluidity of the reaction mixture and permit the reaction to proceed. Heating is discontinued after a total heating time of 20 hours, when evolution of hydrogen chloride practically ceases and the viscosity at 280° C. of the reaction mixture ceases to rise.

The resulting viscous product is removed while hot from the vessel and is allowed to cool to room temperature. It forms a straw coloured tough transparent resin. Its softening point as determined by the ball and ring method is 200° C. The Acid Number of the resin is 12. It is soluble in chloroform, ethylene chloride, ethylene dichloride/toluene mixtures, ethylene chloride/benzene mixture, ethyl alcohol/benzene mixture. All these solutions are chemically stable on storage.

Example 2

The 4:4' dihydroxy diphenyl in Example 1 is replaced by hydroquinone. Hydrogen chloride begins to evolve at a bath temperature about 145° C. and after the reaction proceeds for 11 hours 1% metallic tin is introduced into the vessel and heating is continued so that the total time of heating is 26 hours. For the first three hours the temperature is 150°–160° C., for the next 8 hours the temperature is 180°–200° C. and for the last 15 hours the temperature is 200°–220° C. The product is a straw coloured resin, having a softening point 135° C. and an acid number 14. It is soluble in the same solvents as the resin described in Example 1.

We claim:

1. A process for the production of an artificial resinous material which comprises heating and thereby effecting condensation between a cycloparaffinic phosphonic acid dichloride selected from the group consisting of cyclopentyl phosphonic acid dichloride and cyclohexyl phosphonic acid dichloride and a dihydroxy aromatic compound free of reactive substituents in which the hydroxyl groups are attached directly to the aromatic nucleus and are attached to non-adjacent carbon atoms.

2. A process as set forth in claim 1 wherein the reactants are in substantially equimolecular proportions.

3. A process as set forth in claim 1 wherein the reactants are heated for several hours at a temperature rising progressively as the reaction proceeds from 100–190° C. in the beginning to 200–300° C.

4. A process as set forth in claim 1 wherein a hydrogen chloride elimination catalyst is employed.

5. A process as set forth in claim 1 wherein tin is employed as a hydrogen chloride elimination catalyst.

6. An artificial resinous material in which the repeating unit consists of

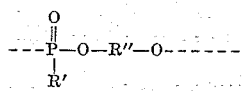

wherein R' is a cycloparaffinic radical selected from the group consisting of cyclopentyl and cyclohexyl and R'' is the radical of HO—R''—OH where HO—R''—OH is a dihydroxy aromatic compound free of reactive substituents in which the hydroxyl groups are attached directly to the aromatic nucleus and are attached to non-adjacent carbon atoms.

HENRYK ZENFTMAN.
ROY McGILLIVRAY.

References Cited in the file of this patent

UNITED STATES PATENTS

| Number | Name | Date |
|---|---|---|
| 2,382,622 | Toy | Aug. 14, 1945 |
| 2,435,252 | Toy | Feb. 3, 1948 |

OTHER REFERENCES

Clayton et al.: Journal American Chem. Soc., vol. 70, 1948, pp. 3880–3882.

Fieser et al.: Organic Chemistry, 2nd ed., Heath 1950, pp. 49 and 50.